July 15, 1958 C. B. JONES 2,843,032
COMBINED DRAG AND CULTIVATOR
Filed May 20, 1955 2 Sheets-Sheet 1

INVENTOR.
Cecil B. Jones
BY
McMorrow, Berman + Davidson
Attorneys

July 15, 1958 C. B. JONES 2,843,032
COMBINED DRAG AND CULTIVATOR
Filed May 20, 1955 2 Sheets-Sheet 2
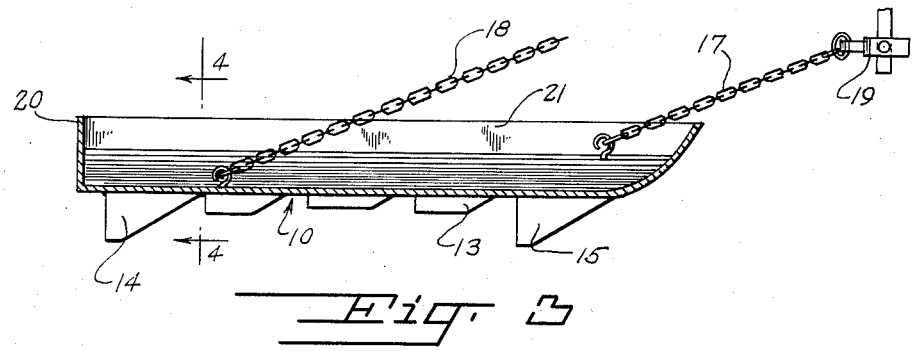
Fig. 3
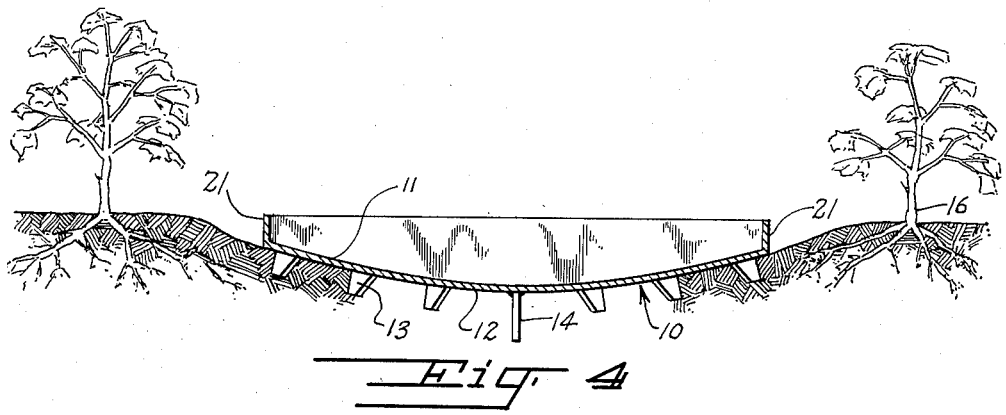
Fig. 4
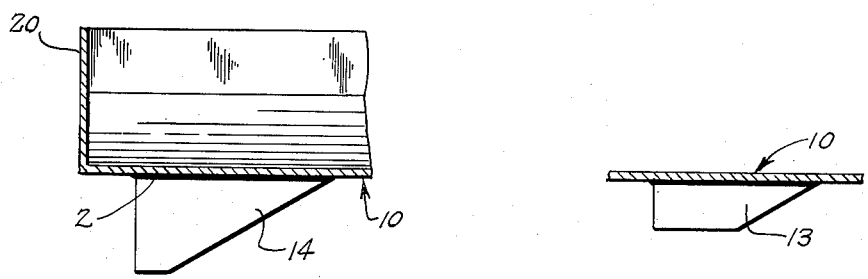
Fig. 5 Fig. 6
INVENTOR.
Cecil B. Jones
BY
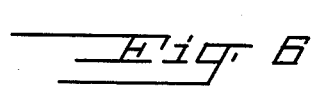
Attorneys United States Patent Office 2,843,032
Patented July 15, 1958

2,843,032

COMBINED DRAG AND CULTIVATOR

Cecil B. Jones, Sherard, Miss., assignor of one-third to Jim Alex Smith, Stovall, Miss.

Application May 20, 1955, Serial No. 509,942

3 Claims. (Cl. 97—9)

The present invention relates to farm implements and in particular to a combined drag and cultivator for cultivating and forming shallow trenches between plant rows.

The primary object of the present invention is to provide a combined drag and cultivator having grass cutting blades and means for moving the dirt between plant rows to form shallow trenches.

Another object of the present invention is to provide a combined drag and cultivator having an upper surface adapted to receive a pile of dirt or stones to act as a weight.

A further object of the present invention is to provide a combined drag of sturdy and inexpensive construction, one capable of standing considerable use, and one which may be manufactured from the sheet steel by either welding or stamping.

These and other objects and advantages of the present invention will be fully apparent from the following description when taken in connection with the annexed drawings, in which:

Figure 3 is a side view in cross-section on line 3—3 of Figure 1,

Figure 2:
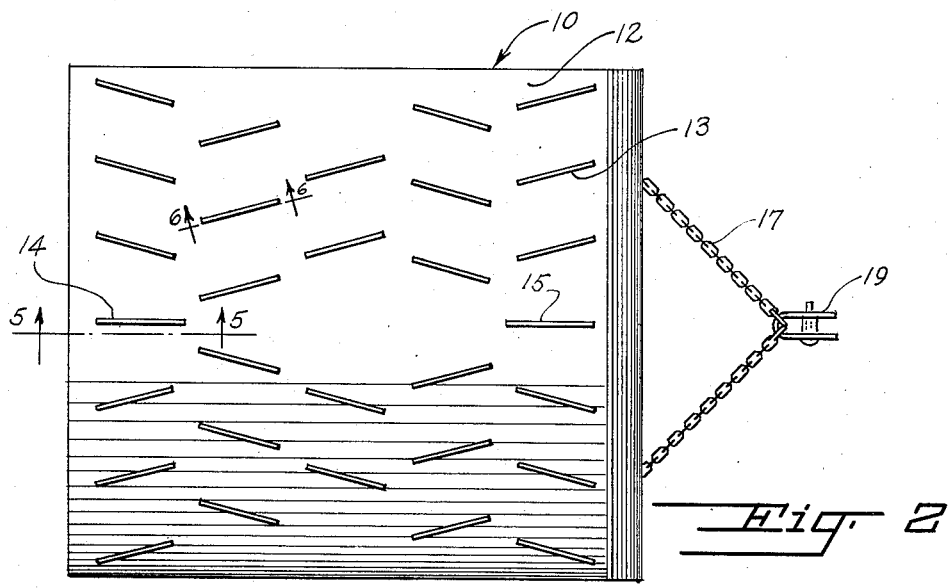
Figure 2 is a bottom plan view.

Figure 4 is an end view in cross-section on line 4—4 of Figure 3 showing the action of the cultivator of the present invention between two rows of plants, Figure 5 is a side view partially in cross-section on line 5—5 of Figure 2, and Figure 6 is a side view of a portion of the present invention on line 6—6 of Figure 2.

Referring in greater detail to the drawings in which like numerals indicate like parts throughout the several views the invention is seen to consist of a horizontally disposed plate 10 having a concave top surface 11 and a convex bottom surface 12. Upon the bottom surface 12 are disposed several rows of angularly arranged blades 13, each blade having its longitudinal axis or its major axis arranged at an angle of approximately 15° to the longitudinal axis of the plate 10.

Each of the blades 13 is arranged in spaced parallel relation with the adjacent blades in each of the rows, the rows being five in number and arranged in tandem spaced relation, and the blades in the first, third, and fourth rows from the front end of the plate 10 are arranged on each side of a median line so as to work the dirt toward the center of the plate 10, the second and fifth rows being so arranged as to work the dirt outwardly from the center. Each of the blades in the rows is arranged with respect to the blade in the row preceding so that the total area of the ground covered by the plate 10 is scraped and grass growing thereon is cut.

A special guide blade 14 is disposed along the longitudinal axis of the plate 10 adjacent to the rear end of the latter and forms a means for holding the plate 10 in a straight line as it is pulled between rows of plants, the latter being indicated by the reference numeral 16 in Figure 4. A similar guide plate 15 is positioned along the longitudinal axis adjacent the front end of the plate 10.

Figure 1:
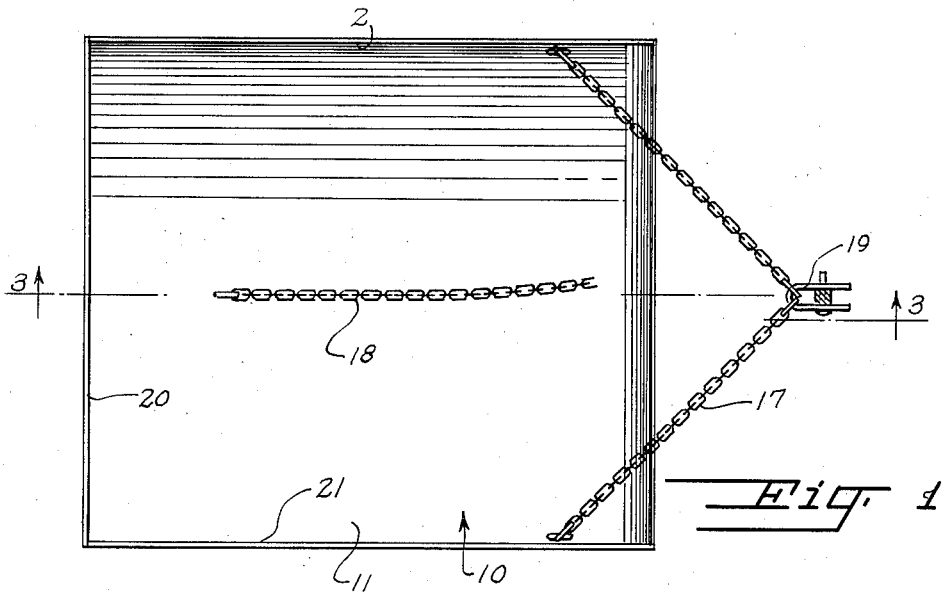
Figure 1 is a top plan view.

Tow chains 17 are provided by means of which the combined drag and cultivator of the present invention is hitched behind a tractor for movement through the field of cotton or other plants, and another chain 18 is provided rearwardly of the center of the plate 10 for attachment to the hydraulic lifting mechanism of the tractor, indicated by the reference numeral 19 in Figure 1, so that the plate 10 may be lifted bodily out of the row at the end of the field.

At the rear end of the plate 10 is secured an upstanding plate 20 having one edge curved with a complemental curve to fit within the concave upper surface 11 of the plate 10, and serving as a stiffening element and also as one wall of a receptacle formed by the plate 20 and the upper surface 11 of the plate 10 so that dirt and rocks may be piled upon the concave upper surface to act as a weight to hold the cultivator into pressing engagement with the ground. Other side walls 21 extend along the side edges of the plate 10 and are connected at their ends to the plate 20.

In Figure 5, the guide blade 14 is seen to be welded by means of the weld 22 to the plate 10.

In Figure 6 is seen one of the blades 13 also welded to the plate 10.

The front end of the plate 10 is upturned to provide additional means for keeping the dirt or stones within the receptacle formed by the upstanding plate 20 and the side walls 21 with the concave upper surface 11 of the plate 10.

The present invention enables shallow cultivation and by such cultivation the growth of weeds and grasses in row crops without disturbing or ruining the root system of the plants is controlled.

What is claimed is:

1. A combined drag and cultivator comprising a horizontally disposed plate having a concave top surface and a convex bottom surface, a plurality of blades projecting perpendicularly from the bottom surface and being fixedly and dependingly attached to said bottom surface, said blades being arranged in a plurality of rows positioned in tandem spaced relation, each of the blades of each row having its major axis disposed at an angle to the longitudinal axis of said plate, a pair of guide blades disposed along the longitudinal axis of said plate, one of said blades being adjacent the front end of said plate and the other of said blades being adjacent the rear end of said plate, both of said guide blades depending perpendicularly from the bottom surface of said plate, and hitch means connected to said plate at the front end thereof for connecting said plate to a tractor for tractive movement therewith.

2. A combined drag and cultivator comprising a horizontally disposed plate having a concave top surface and a convex bottom surface, a plurality of blades projecting perpendicularly from the bottom surface and being fixedly and dependingly attached to said bottom surface, said blades being arranged in a plurality of rows positioned in tandem spaced relation, each of the blades of each row having its major axis disposed at an angle to the longitudinal axis of said plate, a pair of guide blades disposed along the longitudinal axis of said plate, one of said plates being adjacent the front of said plate and the other of said blades being adjacent the rear end of said plate, both of said guide blades depending perpendicularly from the bottom surface of said plate, an upstanding plate having one side edge complementally curved to fix said concave top surface of said first named plate extending across and fixedly secured to the rear end of said first named plate, said upstanding plate and said top surface forming a receptacle, and hitch means connected to said plate at the front end thereof for connecting said plate to a tractor for tractive movement therewith.

3. A combined drag and cultivator comprising a horizontally disposed plate having a concave top surface and a convex bottom surface, a plurality of blades projecting perpendicularly from the said bottom surface and being fixedly and dependingly attached to said bottom surface, said blades being arranged in a plurality of rows positioned in tandem spaced relation, each of the blades of each row having its major axis disposed at an angle with respect to the longitudinal axis of said plate, a pair of guide blades disposed along the longitudinal axis of said plate, one of said blades being adjacent the front of said plate and the other of said guide blades being adjacent the rear end of said plate, both of said guide blades depending perpendicularly from the bottom surface of said plate, an upstanding plate having one side edge complementally curved to fit said concave top surface of said first named plate extending across and fixedly secured to the rear end of said first named plate, said upstanding plate and said top surface forming a receptacle, the front end portion of said plate being upwardly curved so as to retain within the receptacle formed by said upstanding plate and said top surface dirt piled thereon to constitute a weight, and hitch means connected to said plate at the front end thereof for connecting said plate to a tractor for tractive movement therewith.

References Cited in the file of this patent

UNITED STATES PATENTS

| 52,233 | Wells | Jan. 23, 1866 |
| 365,046 | Chadwick | June 21, 1887 |
| 427,353 | McCord | May 6, 1890 |
| 832,350 | Thorp | Oct. 2, 1906 |
| 836,540 | Smith | Nov. 20, 1906 |
| 1,138,024 | Steinfort | May 4, 1915 |
| 1,196,113 | Hood | Aug. 29, 1916 |
| 1,402,586 | Erwin | Jan. 3, 1922 |
| 1,715,616 | Overhold et al. | June 4, 1929 |
| 2,538,705 | Rada | Jan. 16, 1951 |

FOREIGN PATENTS

| 334,266 | Germany | Mar. 11, 1921 |